US008554547B2

(12) United States Patent
Wang

(10) Patent No.: US 8,554,547 B2
(45) **Date of Patent: *Oct. 8, 2013**

(54) VOICE ACTIVITY DECISION BASE ON ZERO CROSSING RATE AND SPECTRAL SUB-BAND ENERGY

(75) Inventor: Zhe Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 13/546,572

(22) Filed: Jul. 11, 2012

(65) Prior Publication Data

US 2012/0278068 A1 Nov. 1, 2012

Related U.S. Application Data

(63) Continuation of application No. 13/307,683, filed on Nov. 30, 2011, now Pat. No. 8,296,133, which is a continuation of application No. PCT/CN2010/077791, filed on Oct. 15, 2010.

(30) Foreign Application Priority Data

Oct. 15, 2009 (CN) .......................... 2009 1 0206840

(51) Int. Cl.
*G10L 21/02* (2013.01)
*G10L 15/20* (2006.01)
*G10L 17/00* (2013.01)

(52) U.S. Cl.
USPC ........... 704/215; 704/213; 704/226; 704/233; 704/248

(58) Field of Classification Search
USPC ....................... 704/210, 213, 248, E15.005-6
See application file for complete search history.

(56) References Cited

U.S. PATENT DOCUMENTS 5,774,849 A 6/1998 Benyassine et al.
5,978,756 A 11/1999 Walker et al.

(Continued)

FOREIGN PATENT DOCUMENTS

CN 1427395 A 7/2003
CN 1632862 A 6/2005

(Continued)

OTHER PUBLICATIONS

Foreign communication from a counterpart PCT application No. PCT/CN2010/077791, International Search Report dated Jan. 13, 2011, 4 pages.

(Continued)

*Primary Examiner* — Jesse Pullias
(74) *Attorney, Agent, or Firm* — Brinks Hofer Gilson & Lione

(57) ABSTRACT

A voice activity detection method and apparatus, and an electronic device are provided. The method includes: obtaining a time domain parameter and a frequency domain parameter from an audio frame; obtaining a first distance between the time domain parameter and a long-term-sliding mean of the time domain parameter in a history background noise frame, and obtaining a second distance between the frequency domain parameter and a long-term-sliding mean of the frequency domain parameter in the history background noise frame; and judging whether the audio frame is a foreground voice frame or a background noise frame according to the first distance, the second distance and a set of decision inequalities based on the first distance and the second distance. The above technical solutions enable the judgment criterion to have an adaptive adjustment capability, thus improving the performance of the voice activity detection.

15 Claims, 3 Drawing Sheets

(56) References Cited

U.S. PATENT DOCUMENTS

| | | | |
|---|---|---|---|
| 6,154,721 | A | 11/2000 | Sonnic |
| 6,832,194 | B1 | 12/2004 | Mozer et al. |
| 7,003,452 | B1 | 2/2006 | Lubiarz et al. |
| 7,020,257 | B2 | 3/2006 | Li |
| 7,277,853 | B1 | 10/2007 | Bou-Gharzale et al. |
| 7,917,356 | B2 | 3/2011 | Chen et al. |
| 2001/0014857 | A1 | 8/2001 | Wang |
| 2002/0010580 | A1 | 1/2002 | Li et al. |
| 2003/0212548 | A1 | 11/2003 | Petty |
| 2005/0038651 | A1 | 2/2005 | Zhang et al. |
| 2007/0198251 | A1 | 8/2007 | Jaber |
| 2007/0282238 | A1 | 12/2007 | Madsen et al. |
| 2007/0288238 | A1 | 12/2007 | Hetherington et al. |
| 2009/0222258 | A1 | 9/2009 | Fukuda et al. |
| 2010/0057453 | A1 | 3/2010 | Valsan |

FOREIGN PATENT DOCUMENTS

| | | | |
|---|---|---|---|
| CN | 101031958 | A | 9/2007 |
| CN | 101197130 | A | 6/2008 |
| CN | 101548313 | A | 9/2009 |
| CN | 102044242 | B | 1/2012 |
| WO | 2008/056720 | A2 | 5/2008 |
| WO | WO 2008/056720 | A2 | 5/2008 |

OTHER PUBLICATIONS

Foreign communication from a counterpart Chinese application No. 200910206840.2,Office Action dated Jun. 28, 2011, 3 pages.

Foreign communication from a counterpart Chinese application No. 200910206840.2, Partial English Translation Office Action dated Jun. 28, 2011, 2 pages.

"Series G: Transmission Systems and Media, Digital Systems and Network—Digital Terminal Equipment—Coding of Voice and Audio Signals—Generic Sound Activity Detector (GSAD)," ITUT G,720.1 Jan. 2010, 26 pages.

Farsi et al., "A Novel Method to Modify VAD Used in ITU-T G.729B for Low SNRs". International Journal of Computers and Communications, Issue 1, vol. 2, 2008.

Office Action issued in commonly owned U.S. Appl. No. 13/307,683, mailed Feb. 22, 2012.

International Search Report and Written Opinion of the International Searching Authority issued in corresponding PCT Patent Application No. PCT/CN2010/077791, mailed Jan. 13, 2011.

Extended European Search Report issued in corresponding European Patent Application No. 10823085.5, mailed Mar. 8, 2012.

ITU-T, "Coding of Speech at 8 kbits/s Using Conjugate Structure Algebraic-code-excited Linear-Prediction (CS-ACELP): Annex B: A Silence Compression Scheme for G.729 Optimized for Terminals Conforming to Recommendation V.70" Series G: Transmission Systems and Media. International Telecommunications Union G.729, Annex B, Nov. 1996.

Benyassine et al., "ITU-T Recommendation G.729 Annex B: A Silence Compression Scheme for Use with G.729 Optimized for V.70 Digital Simultaneous Voice and Data Applications" IEEE Communications Magazine, Sep. 1997. XP-000704425.

ITU-T, "Generic Sound Activity Detector (GSAD)" Series G: Transmission Systems and Media, Digital Systems and Networks. International Telecommunication Union G.720.1, Jan. 2010.

VOICE ACTIVITY DECISION BASE ON ZERO CROSSING RATE AND SPECTRAL SUB-BAND ENERGY

CROSS-REFERENCE TO RELATED APPLICATIONS

This application is a continuation of U.S. patent application Ser. No. 13/307,683 filed on Nov. 30, 2011, which is a continuation of International Application No. PCT/CN2010/077791, filed on Oct. 15, 2010. The International Application claims priority to Chinese Patent Application No. 200910206840.2, filed on Oct. 15, 2009. The afore-mentioned patent applications are hereby incorporated by reference in their entireties.

FIELD

The present disclosure relates to the field of communications technologies, and in particular, to a voice activity detection method and apparatus, and an electronic device.

BACKGROUND

A communication system can determine when communication parties start to talk and when they stop talking by using a Voice Activity Detection (VAD) technology. When the communication parties stop talking, the communication system may not transmit signals, thus saving channel bandwidth. The existing VAD technology is not limited to the voice detection of the communication parties, and may also detect the signals such as a Ring Back Tone (RBT).

A VAD method generally includes: extracting classification parameters from the signals to be detected; and inputting the extracted classification parameters into a binary determination criterion, in which the binary determination criterion determines and outputs a determination result, and the determination result may be that the input signals are foreground signals or the input signals are background noise.

The existing VAD methods are based on a single classification parameter. A VAD method based on four classification parameters also exists at present, the four classification parameters involved in this method are Spectral Distortion (DS), full-band Energy Distance (DEf), low-band Energy Distance (DEl), and Differential Zero-Crossing rate (DZC), and 14 determination conditions are involved in a determination criterion of this method.

In the implementation of the present disclosure, the inventor finds that the prior art at least has the following problems:

False determination easily occurs if the VAD method based on a single classification parameter is used. Because the coefficients in the 14 determination conditions are all constants, the determination criterion fails to have an adaptive adjustment capability according to an input signal, causing undesirable performance of the method.

SUMMARY

The embodiments of the present disclosure provide a voice activity detection method and apparatus, and an electronic device, which enable the determination criterion to have an adaptive adjustment capability, improving the performance of voice activity detection.

An embodiment of the present invention provides a voice activity detection method. The method includes: obtaining a time domain parameter and a frequency domain parameter from a current audio frame to be detected; obtaining a first distance between the time domain parameter and a long-term sliding mean of the time domain parameter in a history background noise frame, and obtaining a second distance between the frequency domain parameter and a long-term sliding mean of the frequency domain parameter in the history background noise frame; and judging whether the audio frame is a foreground voice frame or a background noise frame according to the first distance, the second distance and a set of decision inequalities based on the first distance and the second distance, in which at least one coefficient in the set of decision inequalities is a variable, and the variable is determined by a voice activity detection operation mode or features of an input signal.

An embodiment of the present invention provides a voice activity detection apparatus. The apparatus includes: a first obtaining module, configured to obtain a time domain parameter and a frequency domain parameter from a current audio frame to be detected; a second obtaining module, configured to obtain a first distance between the time domain parameter and a long-term sliding mean of the time domain parameter in a history background noise frame, and obtain a second distance between the frequency domain parameter and a sliding long-term mean of the frequency domain parameter in the history background noise frame; and a judging module, configured to judge whether the current audio frame to be detected is a foreground voice frame or a background noise frame according to the first distance, the second distance and a set of decision inequalities based on the first distance and the second distance, in which at least one coefficient in the set of decision inequalities is a variable, and the variable is determined according to a voice activity detection operation mode or features of an input signal.

It can be seen from the above description of the technical solutions that, the decision inequality in which at least one coefficient is a variable is used, and the variable changes with the voice activity detection operation mode or the features of the input signal, so that the determination criterion has an adaptive adjustment capability, improving the performance of the voice activity detection.

DETAILED DESCRIPTION OF THE DRAWINGS

DETAILED DESCRIPTION OF THE EMBODIMENTS

Embodiment 1

Figure 1:
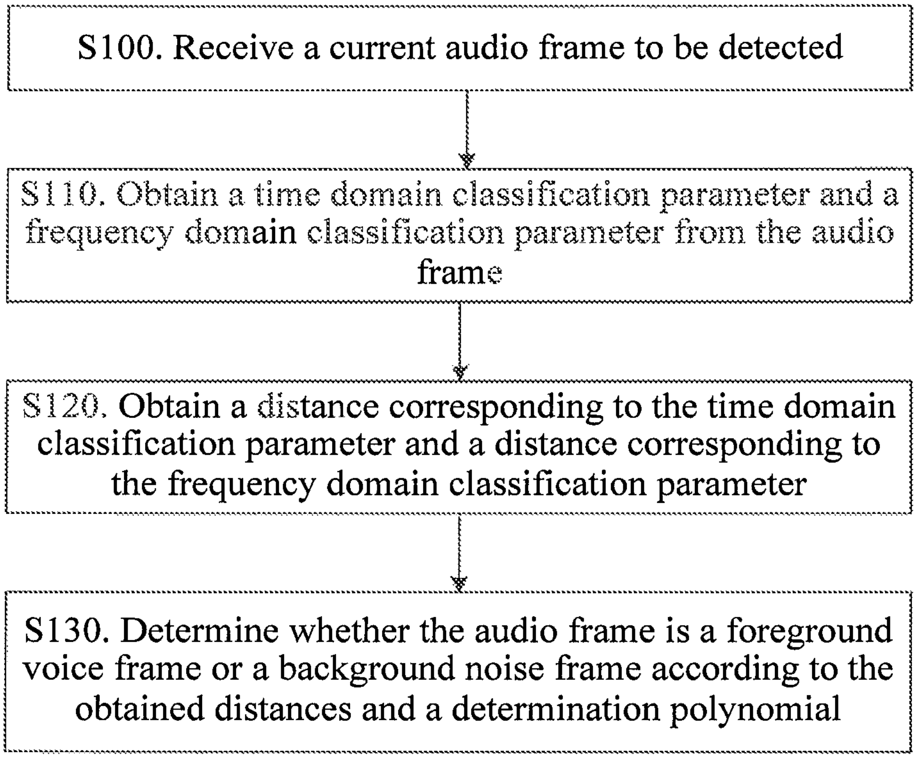
FIG. 1 is a flow chart of a voice activity detection method according to Embodiment 1 of the present disclosure.

A voice activity detection method is provided, as shown in FIG. 1. The method includes the following steps:

Step S100: Receive a current audio frame to be detected.

Step S110: Obtain a time domain parameter and a frequency domain parameter from the current audio frame to be detected. The number of the time domain parameter and the number of the frequency domain parameter may be one herein. It should be noted that, this embodiment does not exclude the possibility that a plurality of the time domain parameters and a plurality of the frequency domain parameters exist.

In this embodiment, the time domain parameter may be a zero-crossing rate, and the frequency domain parameter may be spectral sub-band energy. It should be noted that, in this embodiment, the time domain parameter may be a parameter other than the zero-crossing rate, and the frequency domain parameter may also be a parameter other than the spectral sub-band energy. In order to facilitate the description of the voice activity detection technology of the present disclosure, the zero-crossing rate and the spectral sub-band energy are taken as examples in this embodiment and in the following embodiments to describe the voice activity detection technology of the present disclosure in detail, but it does not mean that the time domain parameter must be the zero-crossing rate, and the frequency domain parameter must be the spectral sub-band energy. This embodiment may not limit specific parameter content of the time domain parameter and the frequency domain parameter.

If the time domain parameter is the zero-crossing rate, the zero-crossing rate may be directly obtained by performing calculation on a time domain input signal of a voice frame. A specific example of obtaining the zero-crossing rate is as follows: the zero-crossing rate (ZCR) is obtained by using the following Formula (1):

$$ZCR = \frac{1}{2}\sum_{i=0}^{M} |\mathrm{sign}(i) - \mathrm{sign}(i+1)| \qquad \text{Formula (1)}$$

in which sign( ) is a sign function, M+2 is the number of time domain sampling points contained in the audio frame, and M is generally an integer greater than one, for example, if the number of time domain sampling points contained in the audio frame is 80, M should be 78.

If the frequency domain parameter is the spectral sub-band energy, the spectral sub-band energy of the voice frame may be obtained by performing calculation on a Fast Fourier Transform (FFT) spectrum. A specific example of obtaining the spectral sub-band energy is as follows: the spectral sub-band energy $E_i$ is obtained by using the following Formula (2):

$$E_i = \frac{1}{M_i}\sum_{k=0}^{M_i-1} e_{I+k} \qquad \text{Formula (2)}$$

in which $M_i$ represents the number of FFT frequency points contained in the $i^{th}$ sub-band in the audio frame, I represents an index of the starting FFT frequency point of the $i^{th}$ sub-band, $e_{I+k}$ represents the energy of the $(I+K)^{th}$ FFT frequency point, and i=0, . . . , N, and N is the number of sub-bands minus one.

N in the Formula (2) may be 15, that is, the audio frame is divided into 16 sub-bands. Each sub-band in the Formula (2) may contain the same number of FFT frequency points, and may also contain different numbers of FFT frequency points. A specific example of setting the value of $M_i$ is as follows: $M_i$ is 128.

The Formula (2) indicates that the spectral sub-band energy of one sub-band may be the average energy of all the FFT frequency points contained in the sub-band.

In this embodiment, the zero-crossing rate and the spectral sub-band energy may be obtained in other manners, and this embodiment does not limit the specific implementation manner in which the zero-crossing rate and the spectral sub-band energy are obtained.

Step S120: Obtain a first distance between the time domain parameter and a long-term sliding mean of the time domain parameter in a history background noise frame, and obtain a second distance between the frequency domain parameter and a long-term sliding mean of the frequency domain parameter in the history background noise frame. This embodiment does not limit the sequence of obtaining the two distances. The “history background noise frame” in this embodiment means a background noise frame previous to the current frame, for example, a plurality of successive background noise frames prior to the current frame. If the current frame is an initial first frame, a preset frame may be used as the background noise frame, or the first frame is used as the background noise frame, and other manners may also be flexibly adopted according to actual applications.

In step S120, the first distance between the time domain parameter and the long-term sliding mean of the time domain parameter in the history background noise frame may include: a corrected distance between the time domain parameter and the long-term sliding mean of the time domain parameter in the history background noise frame.

In step S120, each time if the judgment result is the background noise frame, the long-term sliding mean of the time domain parameter in the history background noise frame and the long-term sliding mean of the frequency domain parameter in the history background noise frame are updated. A specific update example is as follows: The time domain parameter and the frequency domain parameter of the audio frame which is judged as the background noise frame are used to update the current long-term sliding mean of the time domain parameter in the history background noise frame and the current long-term sliding mean of the frequency domain parameter in the history background noise frame.

In the case that the time domain parameter is the zero-crossing rate, a specific example of updating the long-term sliding mean of the time domain parameter in the history background noise frame is as follows: The long-term sliding mean $\overline{ZCR}$ of the zero-crossing rate in the history background noise frame is updated to $\alpha\cdot\overline{ZCR}+(1-\alpha)\cdot ZCR$, in which, $\alpha$ is an update speed control parameter, $\overline{ZCR}$ is a current value of the long-term sliding mean of the zero-crossing rate in the history background noise frame, and ZCR is a zero-crossing rate of the current audio frame which is judged as the background noise frame.

In the case that the frequency domain parameter is the spectral sub-band energy, a specific example of updating the long-term sliding mean of the frequency domain parameter in the history background noise frame is as follows: The long-term sliding mean $\overline{E_i}$ of the spectral sub-band energy in the history background noise frame is updated to $\beta\cdot\overline{E_i}+(1-\beta)\cdot E_i$, in which, i=0, . . . N, N is the number of sub-bands minus one, $\beta$ is an update speed control parameter, $\overline{E_i}$ is a current value of the long-term sliding mean of the spectral sub-band energy in the history background noise frame, and $\overline{E_i}$is spectral sub-band energy of the audio frame.

The values of $\alpha$ and $\beta$ should be smaller than one and greater than zero. In addition, $\alpha$ and $\beta$ may have the same value or different values. The update speeds of $\overline{ZCR}$ and $\overline{E_i}$ may be controlled by setting the values of $\alpha$ and $\beta$. The closer the values of $\alpha$ and $\beta$ are to one, the slower the update speeds of $\overline{ZCR}$ and $\overline{E_i}$, and the closer the values of $\alpha$ and $\beta$ are to zero, the faster the update speeds of $\overline{ZCR}$ and $\overline{E_i}$.

The initial values of $\overline{ZCR}$ and $\overline{E_i}$ may be set by using the first frame or the first few frames of the input signal. For example, the mean of the zero-crossing rates of the first few frames of the input signal is calculated, and the mean is used as the long-term sliding mean $\overline{ZCR}$ of the zero-crossing rate in the history background noise frame; the mean of the spectral sub-band energy of the first few frames of the input signal is calculated, and the mean $\overline{E_i}$ is used as the long-term sliding mean of the spectral sub-band energy in the history background noise frame. In addition, the initial values of $\overline{ZCR}$ and $\overline{E_i}$ may be set in other manners. For example, the initial values of $\overline{ZCR}$ and $\overline{E_i}$ are set by using empirical values. This embodiment does not limit the specific implementation manner in which the initial values of $\overline{ZCR}$ and $\overline{E_i}$ are set.

It can be seen from the above description that, the long-term sliding mean of the time domain parameter in the history background noise frame and the long-term sliding mean of the frequency domain parameter in the history background noise frame are updated if the audio frame is judged as the history background noise frame, and accordingly, the long-term sliding, mean of the time domain parameter in the history background noise frame used in the procedure for judging the current audio frame is the long-term sliding mean of the time domain parameter in the history background noise frame obtained according to the audio frame that is judged as the background noise frame and prior to the current audio frame, and likewise, the long-term sliding mean of the frequency domain parameter in the history background noise frame used in the procedure for judging the current audio frame is the long-term sliding mean of the frequency domain parameter in the history background noise frame obtained according to the audio frame that is judged as the background noise frame and prior to the current audio frame.

If the time domain parameter is the zero-crossing rate, the first distance between the time domain parameter and the long-term sliding mean of the time domain parameter in the history background noise frame may be a differential zero-crossing rate. A specific example of obtaining the distance Delta Zero-Crossing Rate (DZCR) between the zero-crossing rate and the long-term sliding mean of the zero-crossing rate in the history background noise frame is as follows: DZCR is obtained by performing calculation based on the following Formula (3):

$$DZCR = ZCR - \overline{ZCR} \qquad \text{Formula (3)}$$

in which ZCR is the zero-crossing rate of the current audio frame to be detected, and $\overline{ZCR}$ is a current value of the long-term sliding mean of the zero-crossing rate in the history background noise frame.

If the frequency domain parameter is the spectral sub-band energy, the second distance between the frequency domain parameter and the long-term sliding mean of the frequency domain parameter in the history background noise frame may be a signal-to-noise ratio of the current audio frame to be detected. A specific example of obtaining the distance between the frequency domain parameter and the long-term sliding mean of the frequency domain parameter in the history background noise frame, that is, of obtaining the signal-to-noise ratio of the current audio frame to be detected is as follows: A signal-to-noise ratio of each sub-band is obtained according to a ratio of the spectral sub-band energy of the current audio frame to be detected to the long-term sliding mean of the spectral sub-band energy in the history background noise frame; afterwards, linear processing or nonlinear processing is performed on the obtained signal-to-noise ratio of each sub-band (that is, to correct the signal-to-noise ratio of each sub-band), and then the signal-to-noise ratio of each sub-band after the linear processing or the nonlinear processing is summed. In this way, the signal-to-noise ratio of the current audio frame to be detected is obtained. This embodiment does not limit the specific implementation procedure for obtaining the signal-to-noise ratio of the current audio frame to be detected.

It should be noted that, the same linear processing or the same nonlinear processing may be performed on the signal-to-noise ratio of each sub-band in this embodiment, that is, the same linear processing or the same nonlinear processing may be performed on the signal-to-noise ratios of all the sub-bands; and different linear processing or different nonlinear processing may also be performed on the signal-to-noise ratio of each sub-band in this embodiment, that is, different linear processing or different nonlinear processing may be performed on the signal-to-noise ratios of all the sub-bands. The linear processing performed on the signal-to-noise ratio of each sub-band may be as follows: The signal-to-noise ratio of each sub-band is multiplied by a linear function. The nonlinear processing performed on the signal-to-noise ratio of each sub-band may be as follows: The signal-to-noise ratio of each sub-band is multiplied by a nonlinear function. This embodiment does not limit the specific implementation procedure for performing the linear processing or the nonlinear processing on the signal-to-noise ratio of each sub-band.

In the case that the nonlinear processing is performed on the signal-to-noise ratio of each sub-band by using the nonlinear function, a specific example of obtaining the corrected distance Modified Segmental Signal to Noise Ratio (MSSNR) between the spectral sub-band energy and the long-term sliding mean of the spectral sub-band energy in the history background noise frame is as follows: MSSNR is obtained by performing calculation based on the following Formula (4):

$$MSSNR = \sum_{i=0}^{N} \mathrm{MAX}\left(f_i \cdot 10 \cdot \log\left(\frac{E_i}{\overline{E_i}}\right), 0\right) \qquad \text{Formula (4)}$$

in which N is the number of the divided sub-bands of the current audio frame to be detected minus one, $E_i$ is the spectral sub-band energy of the $i^{th}$ sub-band of the current audio frame to be detected, $\overline{E_i}$ is a current value of the long-term sliding mean of the spectral sub-band energy of the $i^{th}$ sub-band in the history background noise frame, and $f_i$ is a nonlinear function of the $i^{th}$ sub-band and $f_i$ may be a noise-reduction coefficient.

$$10 \cdot \log\left(\frac{E_i}{\overline{E_i}}\right)$$

in the Formula (4) is the signal-to noise ratio of the $i^{th}$ sub-band of the current audio frame to be detected.

$$\mathrm{MAX}\left(f_i \cdot 10 \cdot \log\left(\frac{E_i}{\overline{E_i}}\right), 0\right)$$

in the Formula (4) is the correction performed on the signal-to-noise ratio of the sub-band, and if $f_i$ is the noise-reduction coefficient of the sub-band, $$\text{MAX}\left(f_i \cdot 10 \cdot \log\left(\frac{E_i}{\overline{E_i}}\right), 0\right)$$

is the correction performed on the signal-to-noise ratio of the sub-band through the noise-reduction coefficient. The above MSSNR may be called the sum of the signal-to-noise ratio of each sub-band after the correction.

A specific example of $f_i$ in the Formula (4) is as follows:

$$f_i = \begin{cases} \text{MIN}(E_i^2/64, 1) & \text{when } x1 \le i \le x2 \\ \text{MIN}(E_i^2/25, 1) & \text{when } i \text{ is other values} \end{cases},$$

in which i=0, . . . , the number of sub-bands minus one, "i is other values" means that i is a numerical value from zero to the number of sub-bands minus one except the value range from x1 to x2, x1 and x2 are greater than zero and smaller than the number of sub-bands minus one, and values of x1 and x2 are determined according to key sub-bands in all the sub-bands, that is, the key sub-bands (important sub-bands) are corresponding to $\text{MIN}(E_i^2/64, 1)$ and non-key sub-bands (unimportant sub-bands) are corresponding to $\text{MIN}(E_i^2/25, 1)$. With the change of the number of the divided sub-bands, the values of x1 and x2 may change accordingly. The key sub-bands in all the sub-bands may be determined according to empirical values.

In the case that the number of sub-bands is 16, a specific example of $f_i$ in the Formula (4) is as follows:

$$f_i = \begin{cases} \text{MIN}(E_i^2/64, 1) & \text{when } 2 \le i \le 12 \\ \text{MIN}(E_i^2/25, 1) & \text{when } i \text{ is other values} \end{cases},$$

in which i=0, . . . , 15.

DZCR and MSSNR described above by means of example may be called two classification parameters in the voice activity detection method of this embodiment, and in such case, the voice activity detection method of this embodiment may be called a voice activity detection method based on two classification parameters.

Step S130: Determine whether the current audio frame to be detected is a foreground voice frame or a background noise frame according to the first distance, the second distance, and a set of decision inequalities based on the first distance and the second distance, in which at least one coefficient in the set of decision inequalities is a variable, and the variable is determined according to a voice activity detection operation mode and/or features of an input signal. The input signal herein may include: the detected voice frame and signals other than the voice frame. The voice activity detection operation mode may be a voice activity detection operation point. The features of the input signal may be one or more of: a signal long-term signal-to-noise ratio, a background noise fluctuation degree, and a background noise level.

That is, the variable parameter in the set of decision inequalities may be determined according to one or more of: the voice activity detection operation point, the signal long-term signal-to-noise ratio, the background noise fluctuation degree, and the background noise level. A specific example of determining the value of the variable parameter in the set of decision inequalities is as follows: the value of the variable parameter is determined by looking up a table and/or by performing calculation based on a preset formula according to the currently detected voice activity detection operation point, signal long-term signal-to-noise ratio, background noise fluctuation degree, and background noise level.

The voice activity detection operation point represents an operational state of the VAD system, and is externally controlled by the VAD system. The VAD system makes different choices regarding the voice quality and the bandwidth according to different operational states. The signal long-term signal-to-noise ratio represents an overall signal-to-noise ratio of a foreground signal to a background noise of the input signal over a long period. The background noise fluctuation degree represents the rate and/or magnitude of change of background noise energy or noise ingredients of the input signal. This embodiment does not limit the specific implementation manner in which the value of the variable parameter is determined according to the voice activity detection operation point, the signal long-term signal-to-noise ratio, the background noise fluctuation degree, and the background noise level.

There may be one or more decision inequalities contained in the set of decision inequalities in this embodiment.

A specific example of two decision inequalities contained in the set of decision inequalities is as follows: $MSSNR \ge a \cdot DZCR + b$ and $MSSNR \ge (-c) \cdot DZCR + d$, in which, a and c are coefficients, b and d are constants, at least one of a and c is a variable, and at least one of a, b, c and d may be zero, for example, a and b are zero, or c and d are zero; MMSNR is the corrected distance between the spectral sub-band energy and the long-term sliding mean of the spectral sub-band energy in the history background noise frame, and DZCR is the distance between the zero-crossing rate and the long-term sliding mean of the zero-crossing rate in the history background noise frame.

a, b, c and d each may be corresponding to a three-dimensional table, that is, a, b, c and d are corresponding to four three-dimensional tables. The four three-dimensional tables are looked up according to the currently detected voice activity detection operation point, signal long-term signal-to-noise ratio, and background noise fluctuation degree, and the lookup result may be integrated with the background noise level for calculation, thus determining the specific values of a, b, c and d.

A specific example of the three-dimensional table is as follows: Two operational states of the VAD system are set, and the two operational states are expressed as op=0 and op=1, in which op represents the voice activity detection operation point; the signal long-term signal-to-noise ratio lsnr of the input signal is categorized into a high signal-to-noise ratio, a middle signal-to-noise ratio, and a low signal-to-noise ratio, and the three types are respectively expressed as lsnr=2, lsnr=1 and lsnr=0; and the background noise fluctuation degree (bgsta) is also categorized into three types, and the three types of the background noise fluctuation degree are expressed as bgsta=2, bgsta=1 and bgsta=0 in descending order of the background noise fluctuation degree. In the case of the above setting, a three-dimensional table may be established for a, a three-dimensional table may be established for b, a three-dimensional table may be established for c, and a three-dimensional table may be established for d.

If the tables are looked up, index values corresponding to a, b, c and d may be calculated by using the Formula (5), the corresponding numerical values may be obtained from the four three-dimensional tables according to the index values, and the obtained numerical values may be integrated with the background noise level for calculation, thus determining the specific values of a, b, c and d.

a=a_tbl[op][lsnr][bgsta]

b=b_tbl[op][lsnr][bgsta]

c=c_tbl[op][lsnr][bgsta]

d=d_tbl[op][lsnr] [bgsta] Formula (5)

A specific determining procedure based on the two decision inequalities is as follows: If MSSNR and DZCR obtained by performing calculation can satisfy any one of the two decision inequalities, the current audio frame to be detected is determined as the foreground voice frame; otherwise, the current audio frame to be detected is determined as the background noise frame.

Other decision inequalities may also be used in this embodiment. For example, the set of decision inequalities includes: MSSNR>(a+b*DZCRn)m+c, in which, b is a coefficient and a variable, at least one of a , b and c may be zero, a, c, m and n are constants, MSSNR is the corrected distance between the spectral sub-band energy and the long-term sliding mean of the spectral sub-band energy in the history background noise frame, and DZCR is the distance between the zero-crossing rate and the long-term sliding mean of the zero-crossing rate in the history background noise frame. This embodiment does not limit the specific implementation manner of the decision inequalities based on the first distance and the second distance.

It can be known from the above description of Embodiment 1 that, in Embodiment 1, the set of decision inequalities in which at least one coefficient is a variable is used, and the variable changes with the voice activity detection operation mode and/or the features of the input signal, so that the judgment criterion has an adaptive adjustment capability according to the voice activity detection operation mode and/or the features of the input signal, thus improving the performance of the voice activity detection. In the case that the zero-crossing rate and the spectral sub-band energy are used in Embodiment 1, because the distance between the spectral sub-band energy and the long-term sliding mean of the spectral sub-band energy in the history background noise frame has desirable classification performance, the judgment whether the audio frame is the foreground voice frame or the background noise frame is more accurate, thus further improving the performance of the voice activity detection. In the case that the judgment criterion formed by two decision inequalities is used, the complexity of designing the judgment criterion is not excessively increased, and meanwhile, the stability of the judgment criterion can be ensured. Therefore, Embodiment 1 improves the overall performance of voice activity detection.

Embodiment 2

Figure 2:
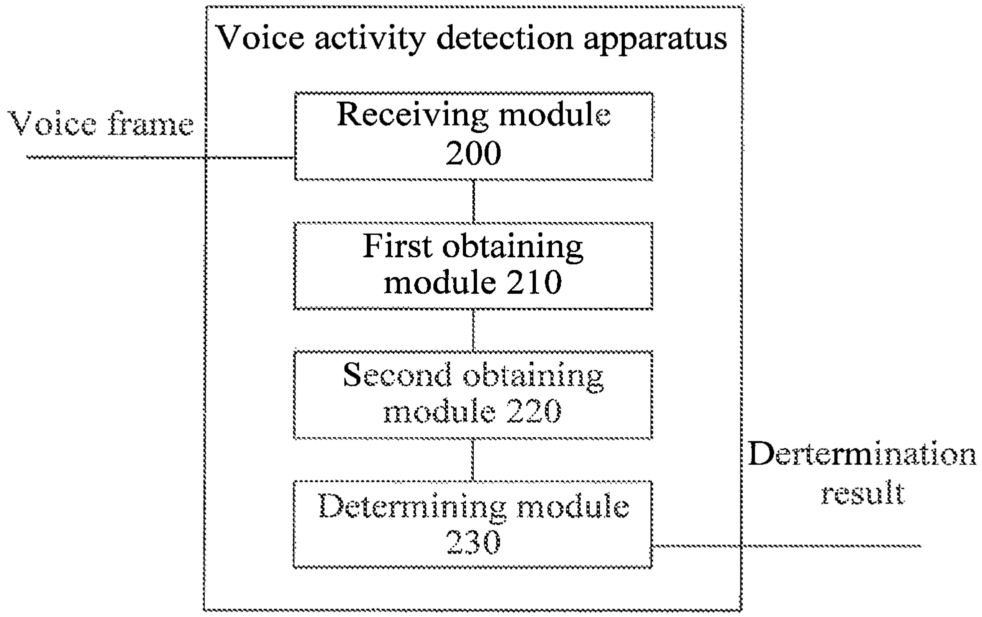
FIG. 2 is a schematic diagram of a voice activity detection apparatus according to Embodiment 2 of the present disclosure.

A voice activity detection apparatus is provided, and the structure of the apparatus is shown in FIG. 2.

The voice activity detection apparatus in FIG. 2 includes: a first obtaining module 210, a second obtaining module 220, and a determining module 230. Optionally, the apparatus further includes a receiving module 200.

The receiving module 200 is configured to receive a current audio frame to be detected.

The first obtaining module 210 is configured to obtain a time domain parameter and a frequency domain parameter from an audio frame. In the case that the apparatus includes the receiving module 200, the first obtaining module 210 may obtain the time domain parameter and the frequency domain parameter from the current audio frame to be detected received by the receiving module 200. The first obtaining module 210 may output the obtained time domain parameter and frequency domain parameter, and the time domain parameter and the frequency domain parameter output by the first obtaining module 210 may be provided for the second obtaining module 220.

The number of the time domain parameter and the number of the frequency domain parameter may be one herein. This embodiment does not exclude the possibility that a plurality of the time domain parameters and a plurality of the frequency domain parameters exist.

The time domain parameter obtained by the first obtaining module 210 may be a zero-crossing rate, and the frequency domain parameter obtained by the first obtaining module 210 may be spectral sub-band energy. It should be noted that, the time domain parameter obtained by the first obtaining module 210 may be parameters other than the zero-crossing rate, and the frequency domain parameter obtained by the first obtaining module 210 may also be parameters other than the spectral sub-band energy.

The second obtaining module is configured to obtain a first distance between the received time domain parameter and a long-term sliding mean of the time domain parameter in a history background noise frame, and obtain a second distance between the received frequency domain parameter and a long-term sliding mean of the frequency domain parameter in the history background noise frame.

The first distance between the time domain parameter and the long-term sliding mean of the time domain parameter in the history background noise frame may include: a corrected distance between the time domain parameter and the long-term sliding mean of the time domain parameter in the history background noise frame.

The second obtaining module 220 stores current values of the long-term sliding mean of the time domain parameter in the history background noise frame and each time if the judgment result of the judging module 230 is a background noise frame, the long-term-sliding mean of the frequency domain parameter in the history background noise frame, updates the stored current values of the long-term sliding mean of the time domain parameter in the history background noise frame and the long-term sliding mean of the frequency domain parameter in the history background noise frame. In the case that the frequency domain parameter obtained by the first obtaining module 210 is the spectral sub-band energy, the second obtaining module may obtain a signal-to-noise ratio of the audio frame, in which the signal-to-noise ratio of the audio frame is the second distance between the frequency domain parameter and the long-term sliding mean of the frequency domain parameter in the history background noise frame.

The determining module 230 is configured to determine whether the current audio frame to be detected is a foreground voice frame or a background noise frame according to the first distance and the second distance that are obtained by the second obtaining module 220 and a set of decision inequalities based on the first distance and the second distance, in which at least one coefficient in the set of decision inequalities used by the determining module 230 is a variable, and the variable is determined according to a voice activity detection operation mode and/or features of an input signal. The input signal herein may include: the detected voice frame and signals other than the voice frame. The voice activity detection operation mode may be a voice activity detection operation point. The features of the input signal may be one or more of: a signal long-term signal-to-noise ratio, a background noise fluctuation degree, and a background noise level.

The determining module 230 may determine the variable parameter in the set of decision inequalities according to one or more of: the voice activity detection operation point, the signal long-term signal-to-noise ratio, the background noise fluctuation degree, and the background noise level. A specific example of determining the value of the variable parameter in the set of decision inequalities by the determining module 230 is as follows: The determining module 230 determines the value of the variable parameter by looking up a table and/or by performing calculation based on a preset formula according to the currently detected voice activity detection operation point, signal long-term signal-to-noise ratio, background noise fluctuation degree, and background noise level.

Figure 2A:
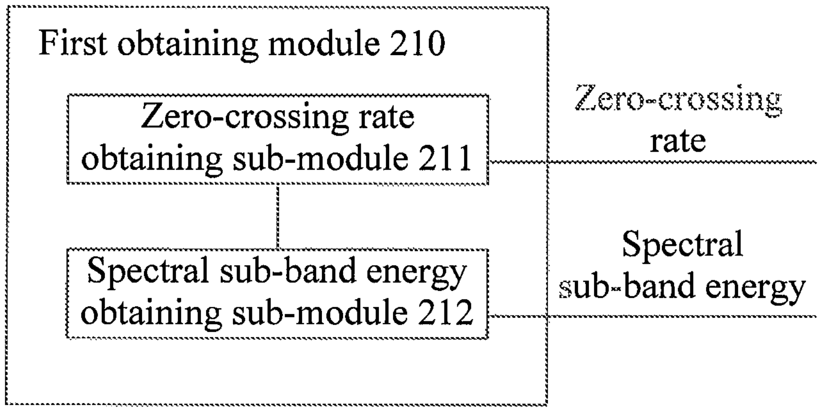
FIG. 2A is a schematic diagram of a first obtaining module according to Embodiment 2 of the present disclosure.

The structure of the first obtaining module 210 is shown in FIG. 2A.

The first obtaining module 210 in FIG. 2A includes: a zero-crossing rate obtaining sub-module 211 and a spectral sub-band energy obtaining sub-module 212.

The zero-crossing rate obtaining sub-module 211 is configured to obtain a zero-crossing rate from the audio frame.

The zero-crossing rate obtaining sub-module 211 may directly obtain the zero-crossing rate by performing calculation on a time domain input signal of a voice frame. A specific example of obtaining the zero-crossing rate by the zero-crossing rate obtaining sub-module 211 is as follows: the zero-crossing rate obtaining sub-module 211 obtains the zero-crossing rate through $$ZCR = \frac{1}{2}\sum_{i=0}^{M} |\text{sign}(i) - \text{sign}(i+1)|,$$

in which, sign( ) is a sign function, M+2 is the number of time domain sampling points contained in the audio frame, and M is generally an integer greater than one, for example, if the number of time domain sampling points contained in the audio frame is 80, M should be 78.

The spectral sub-band energy obtaining sub-module 212 is configured to obtain spectral sub-band energy from the audio frame.

The spectral sub-band energy obtaining sub-module 212 may obtain spectral sub-band energy of a voice frame by performing calculation on an FFT spectrum. A specific example of obtaining the spectral sub-band energy by the spectral sub-band energy obtaining sub-module 212 is as follows: the spectral sub-band energy obtaining sub-module 212 obtains the spectral sub-band energy $E_i$ through $$E_i = \frac{1}{M_i}\sum_{k=0}^{M_i-1} e_{i+k},$$

in which $M_i$ represents the number of FFT frequency points contained in the $i^{th}$ sub-band in the audio frame, I represents an index of the starting FFT frequency point of the $i^{th}$ sub-hand, $e_{I+k}$ represents the energy of the $(I+K)^{th}$ FFT frequency point, and i=0, . . . , N, where N is the number of sub-bands minus one. N may be 15, that is, the audio frame is divided into 16 sub-bands.

Each sub-band in this embodiment may contain the same number of FFT frequency points, and may also contain different numbers of FFT frequency points. A specific example of setting the value of $M_i$ is as follows: $M_i$ is 128.

In this embodiment, the zero-crossing rate obtaining sub-module 211 and the spectral sub-band energy obtaining sub-module 212 may obtain the zero-crossing rate and the spectral sub-band energy in other manners. This embodiment does not limit the specific implementation manner in which the zero-crossing rate and the spectral sub-band energy are obtained by the zero-crossing rate obtaining sub-module 211 and the spectral sub-band energy obtaining sub-module 212.

Figure 2B:
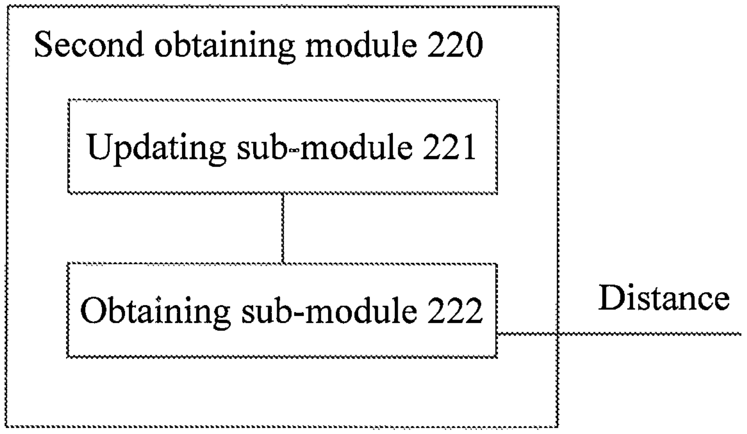
FIG. 2B is a schematic diagram of a second obtaining module according to Embodiment 2 of the present disclosure.

The structure of the second obtaining module 220 is shown in FIG. 2B.

The second obtaining module 220 in FIG. 2B includes: an updating sub-module 221 and an obtaining sub-module 222.

The updating sub-module 221 is configured to store the long-term sliding mean of the time domain parameter in the history background noise frame and the long-term sliding mean of the frequency domain parameter in the history background noise frame, and if the audio frame is judged as the background noise frame by the judging module 230, update the stored long-term sliding mean of the time domain parameter in the history background noise frame according to the time domain parameter of the audio frame, and update the stored long-term sliding mean of the frequency domain parameter in the history background noise frame according to the frequency domain parameter of the audio frame.

In the case that the time domain parameter is the zero-crossing rate, a specific example of updating the long-term sliding mean of the time domain parameter in the history background noise frame by the updating sub-module 221 is as follows: the long-term sliding mean $\overline{ZCR}$ of the zero-crossing rate in the history background noise frame is updated to $\alpha\cdot\overline{ZCR}+(1-\alpha)\cdot ZCR$, in which, α is an update speed control parameter, $\overline{ZCR}$ is a current value of the long-term sliding mean of the zero-crossing rate in the history background noise frame, and ZCR is a zero-crossing rate of the current audio frame which is judged as the background noise frame.

In the case that the frequency domain parameter is the spectral sub-band energy, a specific example of updating the long-term sliding mean of the frequency domain parameter in the history background noise frame by the updating sub-module 221 is as follows: The updating sub-module 221 updates the long-term sliding mean $\overline{E_i}$ of the spectral sub-band energy in the history background noise frame as $\beta\cdot\overline{E_i}+(1-\beta)\cdot E_i$, in which, i =0, . . . N, N is the number of sub-bands minus one, βis an update speed control parameter, $\overline{E_i}$ is is a current value of the long-term sliding mean of the spectral sub-band energy in the history background noise frame, and $\overline{E_i}$ is spectral sub-band energy of the audio frame.

The values of α and β should be smaller than one and greater than zero. In addition, α and β may have the same value or different values. The update speeds of $\overline{ZCR}$ and $\overline{E_i}$ may be controlled by setting the values α and β. The closer the values of α and β are to one, the slower the update speeds of $\overline{ZCR}$ $\overline{E_i}$, and the closer the values of α and β are to zero, the faster the update speeds of $\overline{ZCR}$ and $\overline{E_i}$.

The updating sub-module 221 may use the first frame or first few frames of the input signal to set the initial values of $\overline{ZCR}$ and $\overline{E_i}$ . For example, the updating sub-module 221 calculates the mean of the zero-crossing rates of the first few frames of the input signal, and the updating sub-module 221 uses the mean as the long-term sliding mean $\overline{ZCR}$ of the zero-crossing rate in the history background noise frame; the updating sub-module 221 calculates the mean of the spectral sub-band energy of the first few frames of the input signal, and the updating sub-module 221 uses the mean $\overline{E_i}$ as the long-term sliding mean of the spectral sub-band energy in the history background noise frame. In addition, the updating sub-module 221 may use other manners to set the initial values of $\overline{ZCR}$ and $\overline{E_i}$. For example, the updating sub-module 221 uses empirical values to set the initial values of $\overline{ZCR}$ and $\overline{E_i}$. This embodiment does not limit the specific implementation manner in which the initial values of $\overline{ZCR}$ and $\overline{E_i}$ are set by the updating sub-module 221.

The obtaining sub-module 222 is configured to obtain the two distances according to the two means stored in the updating sub-module 221 and the time domain parameter and the frequency domain parameter obtained by the first obtaining module 210.

If the time domain parameter is the zero-crossing rate, the obtaining sub-module 222 may use a differential zero-crossing rate as the distance between the time domain parameter and the long-term sliding mean of the time domain parameter in the history background noise frame. A specific example of obtaining the distance DZCR between the zero-crossing rate and the long-term sliding mean of the zero-crossing rate in the history background noise frame by the obtaining sub-module 222 is as follows: the obtaining sub-module 222 obtains DZCR by performing calculation based on $DZCR=ZCR-\overline{ZCR}$ in which ZCR is the zero-crossing rate of the current audio frame to be detected, and $\overline{ZCR}$ is a current value of the long-term sliding mean of the zero-crossing rate in the history background noise frame.

If the frequency domain parameter is the spectral sub-band energy, the obtaining sub-module 222 may use the signal-to-noise ratio of the current audio frame to be detected as the second distance between the frequency domain parameter and the long-term sliding mean of the frequency domain parameter in the history background noise frame. A specific example of obtaining the signal-to-noise ratio of the current audio frame to be detected by the obtaining sub-module 222 is as follows: the obtaining sub-module 222 obtains a signal-to-noise ratio of each sub-band according to a ratio of the spectral sub-band energy of the current audio frame to be detected to the long-term sliding mean of the spectral sub-band energy in the history background noise frame; afterwards, the obtaining sub-module 222 performs linear processing or nonlinear processing on the obtained signal-to-noise ratio of each sub-band (that is, to correct the signal-to-noise ratio of each sub-band), and then the obtaining sub-module 222 sums the signal-to-noise ratio of each sub-band after the linear processing or the nonlinear processing, thus obtaining the signal-to-noise ratio of the current audio frame to be detected. This embodiment does not limit the specific implementation procedure for obtaining the signal-to-noise ratio of the current audio frame to be detected by the obtaining sub-module 222.

It should be noted that, the obtaining sub-module 222 in this embodiment may perform the same linear processing or the same nonlinear processing on the signal-to-noise ratio of each sub-band, that is, perform the same linear processing or the same nonlinear processing on the signal-to-noise ratios of all the sub-bands; and the obtaining sub-module 222 in this embodiment may also perform different linear processing or different nonlinear processing on the signal-to-noise ratio of each sub-band, that is, perform different linear processing or different nonlinear processing on the signal-to-noise ratios of all the sub-bands. The linear processing performed on the signal-to-noise ratio of each sub-band by the obtaining sub-module 222 may be as follows: the obtaining sub-module 222 multiplies the signal-to-noise ratio of each sub-band by a linear function. The nonlinear processing performed on the signal-to-noise ratio of each sub-band by the obtaining sub-module 222 may be as follows: the obtaining sub-module 222 multiplies the signal-to-noise ratio of each sub-band by a nonlinear function. This embodiment does not limit the specific implementation procedure for performing the linear processing or the nonlinear processing on the signal-to-noise ratio of each sub-band by the obtaining sub-module 222.

In the case that the nonlinear processing is performed on the signal-to-noise ratio of each sub-band by using the nonlinear function, a specific example of obtaining the corrected distance MSSNR between the spectral sub-band energy and the long-term sliding mean of the spectral sub-band energy in the history background noise frame by the obtaining sub-module 222 is as follows: the obtaining sub-module 222 obtains MSSNR by performing calculation based on $$MSSNR = \sum_{i=0}^{N} \mathrm{MAX}\left(f_i \cdot 10 \cdot \log\left(\frac{E_i}{\overline{E_i}}\right), 0\right),$$

in which, N is the number of the divided sub-bands of the current audio frame to be detected minus one, $E_i$ is the spectral sub-band energy of the $i^{th}$ sub-band of the current audio frame to be detected, $\overline{E_i}$ is a current value of the long-term sliding mean of the spectral sub-band energy of the $i^{th}$ sub-band in the history background noise frame, and $f_i$ is a nonlinear function of the $i^{th}$ sub-band and $f_i$ may be a noise-reduction coefficient of the sub-band. The above $$10 \cdot \log\left(\frac{E_i}{\overline{E_i}}\right)$$

is the signal-to noise ratio of the $i^{th}$ sub-band of the current audio frame to be detected. The above $$\mathrm{MAX}\left(f_i \cdot 10 \cdot \log\left(\frac{E_i}{\overline{E_i}}\right), 0\right)$$

is the correction performed on the signal-to-noise ratio of the sub-band by the obtaining sub-module 222, and if $f_i$ is the noise-reduction coefficient of the sub-band, $$\mathrm{MAX}\left(f_i \cdot 10 \cdot \log\left(\frac{E_i}{\overline{E_i}}\right), 0\right)$$

is the correction performed on the signal-to-noise ratio of the sub-band through the noise-reduction coefficient by the obtaining sub-module 222. The above MSSNR may be called the sum of the signal-to-noise ratio of each sub-band after the correction.

A specific example of $f_i$ used by the obtaining sub-module 222 is as follows:

$$f_i = \begin{cases} \mathrm{MIN}(E_i^2/64,\ 1) & \text{when } x1 \le i \le x2 \\ \mathrm{MIN}(E_i^2/25,\ 1) & \text{when } i \text{ is other values} \end{cases},$$

in which, i=0, . . . , the number of sub-bands minus one, "i is other values" means that i is a numerical value from zero to the number of sub-bands minus one except the value range from x1 to x2, x1 and x2 are greater than zero and smaller than the number of sub-bands minus one, and values of x1 and x2 are determined according to key sub-bands in all the sub-bands, that is, the key sub-bands (important sub-bands) are corresponding to MIN($E_i^2$/64, 1) and non-key sub-bands (unimportant sub-bands) are corresponding to MIN($E_i^2$/25, 1). With the change of the number of the divided sub-bands, the values of x1 and x2 set in the obtaining sub-module 222 may also change accordingly. The obtaining sub-module 222 may determine the key sub-bands in all the sub-bands according to empirical values.

In the case that the number of sub-bands is 16, a specific example of $f_i$ used by the obtaining sub-module 222 is as follows:

$$f_i = \begin{cases} \mathrm{MIN}(E_i^2/64,\ 1) & \text{when } 2 \le i \le 12 \\ \mathrm{MIN}(E_i^2/25,\ 1) & \text{when } i \text{ is other values} \end{cases}$$

Figure 2C:
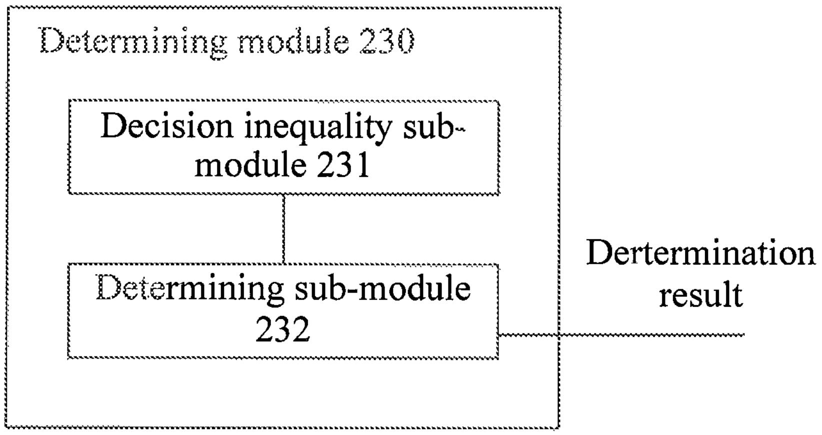
FIG. 2C is a schematic diagram of a determining module according to Embodiment 2 of the present disclosure.

The structure of the determining module 230 is shown in FIG. 2C.

The determining module 230 in the FIG. 2C includes: a decision inequality sub-module 231 and a determining sub-module 232.

The decision inequality sub-module 231 is configured to store the set of decision inequalities, and adjust the variable coefficient in the set of decision inequalities according to one or more of: the voice activity detection operation point, the signal long-term signal-to-noise ratio, the background noise fluctuation degree, and the background noise level.

The number of decision inequalities contained in the set of decision inequalities stored in the decision inequality sub-module 231 may be one, two, or more than two. A specific example of two decision inequalities contained in the set of decision inequalities stored in the decision inequality sub-module 231 is as follows: MSSNR≥a·DZCR+b and MSSNR≥(−c)·DZCR+d in which a and c are coefficients, b and d are constants, at least one of a and c and is a variable parameter, and at least one of a, b, c and d may be zero, for example, a and b are zero, or c and d are zero; MMSNR is the corrected distance between the spectral sub-band energy and the long-term sliding mean of the spectral sub-band energy in the history background noise frame, and DZCR is the distance between the zero-crossing rate and the long-term sliding mean of the zero-crossing rate in the history background noise frame.

a, b, c and d each may be corresponding to a three-dimensional table, that is, a, b, c and d are corresponding to four three-dimensional tables. The four three-dimensional tables may be stored in the decision inequality sub-module 231. The decision inequality sub-module 231 looks up in the four three-dimensional tables according to the currently detected voice activity detection operation point, signal long-term signal-to-noise ratio, and background noise fluctuation degree, and the decision inequality sub-module 231 may integrate the lookup result with the background noise level for calculation, thus determining the specific values of a, b, c and d.

A specific example of the three-dimensional table stored in the decision inequality sub-module 231 is as follows: Two operational states of the VAD system are set, and the two operational states are expressed as op=0 and op=1, in which op represents the voice activity detection operation point; the signal long-term signal-to-noise ratio lsnr of the input signal is categorized into a high signal-to-noise ratio, a middle signal-to-noise ratio, and a low signal-to-noise ratio, and the three types are respectively expressed as lsnr=2, lsnr=1 and lsnr=0; and the background noise fluctuation degree (bgsta) is also categorized into three types, and the three types of the background noise fluctuation degree are expressed as bgsta=2, bgsta=1 and bgsta=0 in descending order of the background noise fluctuation degree. In the case of the above setting, the decision inequality sub-module 231 may establish a three-dimensional table for a, a three-dimensional table for b, a three-dimensional table for c, and a three-dimensional table for d.

When the decision inequality sub-module 231 looks up the tables, index values respectively corresponding to a, b, c and d may be calculated first, and afterwards, the decision inequality sub-module 231 may obtain the corresponding numerical values from the four three-dimensional tables according to the index values.

The decision inequality sub-module 231 may also store other decision inequalities. For example, the decision inequalities stored in the decision inequality sub-module 231 include MSSNR>(a+b*DZCRn)m+c, in which, b is a coefficient and a variable , at least one of a, b and c may be zero, a, c, m and n are constants, MSSNR is the corrected distance between the spectral sub-band energy and the long-term sliding mean of the spectral sub-band energy in the history background noise frame, and DZCR is the distance between the zero-crossing rate and the long-term sliding mean of the zero-crossing rate in the history background noise frame. This embodiment does not limit the specific forms of the decision inequalities stored in the decision inequality sub-module 231.

The determining sub-module 232 is configured to determine whether the current audio frame to be detected is the foreground voice frame or the background noise frame according to the set of decision inequalities stored in the decision inequality sub-module 231.

In the case that the two decision inequalities stored in the decision inequality sub-module 231 are MSSNR≥a·DZCR−b and MSSNR≥(−c)·DZCR+d, a specific determining procedure for the determining sub-module 232 is as follows: if the MSSNR and DZCR obtained by performing calculation of the second obtaining module 220 or the obtaining sub-module 222 can satisfy any one of the two decision inequalities, the determining sub-module 232 determines the current audio frame to be detected as the foreground voice frame; otherwise, the determining sub-module 232 determines the current audio frame to be detected as the background noise frame.

It can be known from the above description of Embodiment 2 that, the judging module 230 in Embodiment 2 uses the set of decision inequalities in which at least one coefficient is a variable, and the variable changes with the voice activity detection operation mode and/or the features of the input signal, so that the judgment criterion in the judging module 230 has an adaptive adjustment capability according to the voice activity detection operation mode and/or the features of the input signal, thus improving the performance of the voice activity detection. In the case that the first obtaining module 210 uses the spectral sub-band energy in Embodiment 2, because the distance between the spectral sub-band energy and the long-term sliding mean of the spectral sub-band energy in the history background noise frame obtained by the second obtaining module 220 has desirable classification performance, the judging module 230 can more accurately judge whether the audio frame to be detected is the foreground voice frame or the background noise frame, thus further improving the detection performance of the voice activity detection apparatus. In the case that the judging module 230 uses the judgment criterion formed by two decision inequalities in Embodiment 2, the complexity of designing the judgment criterion is not excessively increased, and meanwhile, the stability of the judgment criterion can be ensured. Therefore, Embodiment 2 improves the overall performance of voice activity detection.

Embodiment 3

Figure 3:
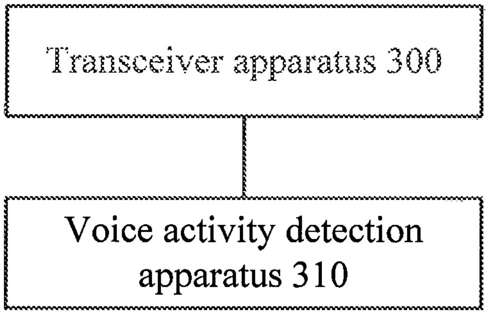
FIG. 3 is a schematic diagram of an electronic device according to Embodiment 3 of the present disclosure.

An electronic device is provided, and the structure of the electronic device is shown in FIG. 3.

The electronic device in FIG. 3 includes a transceiver apparatus 300 and a voice activity detection apparatus 310.

The transceiver apparatus 300 is configured to receive or transmit an audio signal, The voice activity detection apparatus 310 may obtain a current audio frame to be detected from the audio signal received by the transceiver apparatus 300. For the technical solution of the voice activity detection apparatus 310, reference may be made to the technical solution in Embodiment 2, so that the details are not described herein again.

The electronic device in the embodiment of the present disclosure may be a mobile phone, a video processing apparatus, a computer, or a server.

By using the electronic device provided by the embodiment of the present disclosure, the decision inequality in which at least one coefficient is a variable is used, and the variable changes with the voice activity detection operation mode or the features of the input signal, so that the determination criterion has an adaptive adjustment capability, thus improving the performance of the voice activity detection.

Through the above description of the implementation, it is clear to persons skilled in the art that the present disclosure may be accomplished through software plus a necessary universal hardware platform, or definitely may also be accomplished through hardware completely. Based on this, all or part of the technical solutions of the present disclosure that make contributions to the prior art may be embodied in the form of a software product. The computer software product may be stored in a storage medium (for example, a read only memory (ROM)/random access memory (RAM), a magnetic disk or an optical disk) and contain several instructions configured to instruct a computer equipment having a processor (for example, a personal computer, a server, or network equipment) to perform the method according to the embodiments of the present disclosure.

What is claimed is:

1. A voice activity detection method, comprising:

obtaining a time domain parameter and a frequency domain parameter from a current audio frame to be detected;

obtaining a first distance between the time domain parameter and a long-term sliding mean of the time domain parameter in a history background noise frame;

obtaining a second distance between the frequency domain parameter and a long-term sliding mean of the frequency domain parameter in the history background noise frame; and judging whether the current audio frame is a foreground voice frame or a background noise frame according to the first distance, the second distance, and a set of decision inequalities based on the first distance and the second distance, wherein at least one coefficient in the set of decision inequalities is a variable determined in response to features of an input signal.

2. The method according to claim 1, wherein if the audio frame is judged to be the background noise frame, then the long-term sliding mean of the time domain parameter in the history background noise frame is updated according to the time domain parameter of the audio frame and the long-term sliding mean of the frequency domain parameter in the history background noise frame is updated according to the frequency domain parameter of the audio frame.

3. The method according to claim 1, wherein the time domain parameter is a zero-crossing rate, and wherein the first distance between the time domain parameter and the long-term sliding mean of the time domain parameter in the history background noise frame is a Differential Zero-Crossing rate (DZC).

4. The method according to claim 3, wherein if the audio frame is judged to be the background noise frame, then the long-term sliding mean of the zero-crossing rate in the history background noise frame is updated to a $\alpha\cdot\overline{ZCR}+(1-\alpha)\cdot ZCR$, and wherein $\alpha$ is an update speed control parameter, $\overline{ZCR}$ is a current value of the long-term sliding mean of the zero-crossing rate in the history background noise frame, and ZCR is a zero-crossing rate of the audio frame.

5. The method according to claim 1, wherein the frequency domain parameter indicates spectral sub-band energy, and wherein the second distance between the frequency domain parameter and the long-term sliding mean of the frequency domain parameter in the history background noise frame is a signal-to-noise ratio of the audio frame.

6. The method according to claim 5, wherein if the audio frame is judged to be the background noise frame, then the long-term sliding mean of the spectral sub-band energy in the history background noise frame is updated to $\beta\cdot\overline{E_i}+(1-\beta)\cdot E_i$, and wherein $i=0, \ldots N$, N is the number of sub-bands minus one, $\beta$ is an update speed control parameter, $\overline{E_i}$ is a current value of the long-term sliding mean of the spectral sub-band energy in the history background noise frame, and $E_i$ is spectral sub-band energy of the audio frame.

7. The method according to claim 5, wherein obtaining the signal-to-noise ratio of the audio frame comprises:

obtaining a signal-to-noise ratio of each sub-band according to a ratio of the spectral sub-band energy to the long-term sliding mean of the spectral sub-band energy in the history background noise frame;

performing linear processing or nonlinear processing on the signal-to-noise ratio of each sub-band; and summing the signal-to-noise ratio of each sub-band after the processing to obtain the signal-to-noise ratio of the audio frame.

8. The method according to claim 7, wherein performing the linear processing on the signal-to-noise ratio of each sub-band comprises performing linear processing on the signal-to-noise ratio of each sub-band, and wherein performing the nonlinear processing on the signal-to-noise ratio of each sub-band comprises performing either the same nonlinear processing or different nonlinear processing on the signal-to-noise ratio of each sub-band.

9. The method according to claim 1, wherein judging whether the current audio frame is the foreground voice frame or the background noise frame according to the first distance, the second distance, and the set of decision inequalities based on the first distance and the second distance comprises:

judging that the current audio frame is the foreground voice frame if the first distance and the second distance satisfy any one decision inequality in the set of decision inequalities; and judging that the audio frame is the background noise frame if the first distance and the second distance satisfy none of decision inequality in the set of decision inequalities.

10. The method according to claim 1, wherein determining the variable according to the voice activity detection operation mode or the features of the input signal comprises determining the variable according to one or more of: the voice activity detection operation point, the signal long-term signal-to-noise ratio, the background noise fluctuation degree, and the background noise level, and wherein the voice activity detection operation mode comprises a voice activity detection operation point, and the features of the input signal comprise one or more of: a signal long-term signal-to-noise ratio, a background noise fluctuation degree, and a background noise level.

11. A voice activity detection apparatus, comprising:

a first obtaining module, configured to obtain a time domain parameter and a frequency domain parameter from a current audio frame to be detected;

a second obtaining module, configured to obtain a first distance between the time domain parameter and a long-term sliding mean of the time domain parameter in a history background noise frame, and obtain a second distance between the frequency domain parameter and a long-term sliding mean of the frequency domain parameter in the history background noise frame; and a judging module, configured to judge whether the current audio frame to be detected is a foreground voice frame or a background noise frame according to the first distance, the second distance, and a set of decision inequalities based on the first distance and the second distance, wherein at least one coefficient in the set of decision inequalities is a variable determined in response to features of an input signal.

12. The apparatus according to claim 11, wherein the judging module comprises:

a decision inequality sub-module, configured to store the set of decision inequalities, and adjust the variable coefficient in the set of decision inequalities according to at least one of: a voice activity detection operation point, a signal long-term signal-to-noise ratio, a background noise fluctuation degree, and a background noise level; and a judging sub-module, configured to judge whether the audio frame is the foreground voice frame or the background noise frame according to the set of decision inequalities stored in the decision inequality sub-module.

13. The apparatus according to claim 11, wherein the second obtaining module comprises:

an updating sub-module, configured to store the long-term sliding mean of the time domain parameter in the history background noise frame and the long-term sliding mean of the frequency domain parameter in the history background noise frame, and if the audio frame is judged as the background noise frame by the judging module, update the stored long-term sliding mean of the time domain parameter in the history background noise frame according to the time domain parameter of the audio frame, and update the stored long-term sliding mean of the frequency domain parameter in the history background noise frame according to the frequency domain parameter of the audio frame; and an obtaining sub-module, configured to obtain the first distance and the second distance according to the long-term sliding mean of the time domain parameter in the history background noise frame, wherein the long-term sliding mean of the frequency domain parameter in the history background noise frame stored in the updating sub-module, and wherein the time domain parameter and the frequency domain parameter are $_{13}$obtained by the first obtaining module.

14. The apparatus according to claim 11, wherein the first obtaining module comprises.

a zero-crossing rate obtaining sub-module, configured to obtain a zero-crossing rate from the audio frame; and a spectral sub-band energy obtaining sub-module, configured to obtain spectral sub-hand energy from the audio frame, wherein the second obtaining module obtains a signal-to-noise ratio of the audio frame, and wherein the signal-to-noise ratio of the audio frame is the distance between the frequency domain parameter and the long-term sliding mean of the frequency domain parameter in the history background noise frame.

15. The apparatus according to claim 14, wherein the second obtaining module or the obtaining sub-module is configured to obtain a signal-to-noise ratio of each sub-band according to a ratio of the spectral sub-band energy to a long-term sliding mean of the spectral sub-band energy in the history background noise frame, performs linear processing or non-linear processing on the signal-to-noise ratio of each sub-band, and sums the signal-to-noise ratio of each sub-band after the processing to obtain the signal-to-noise ratio of the audio frame.

* * * * *